Dec. 31, 1963    P. W. MARTIN    3,116,419
TRACER INJECTOR MEANS UTILIZING A RADIOACTIVE ELECTRODE
Filed Aug. 6, 1959
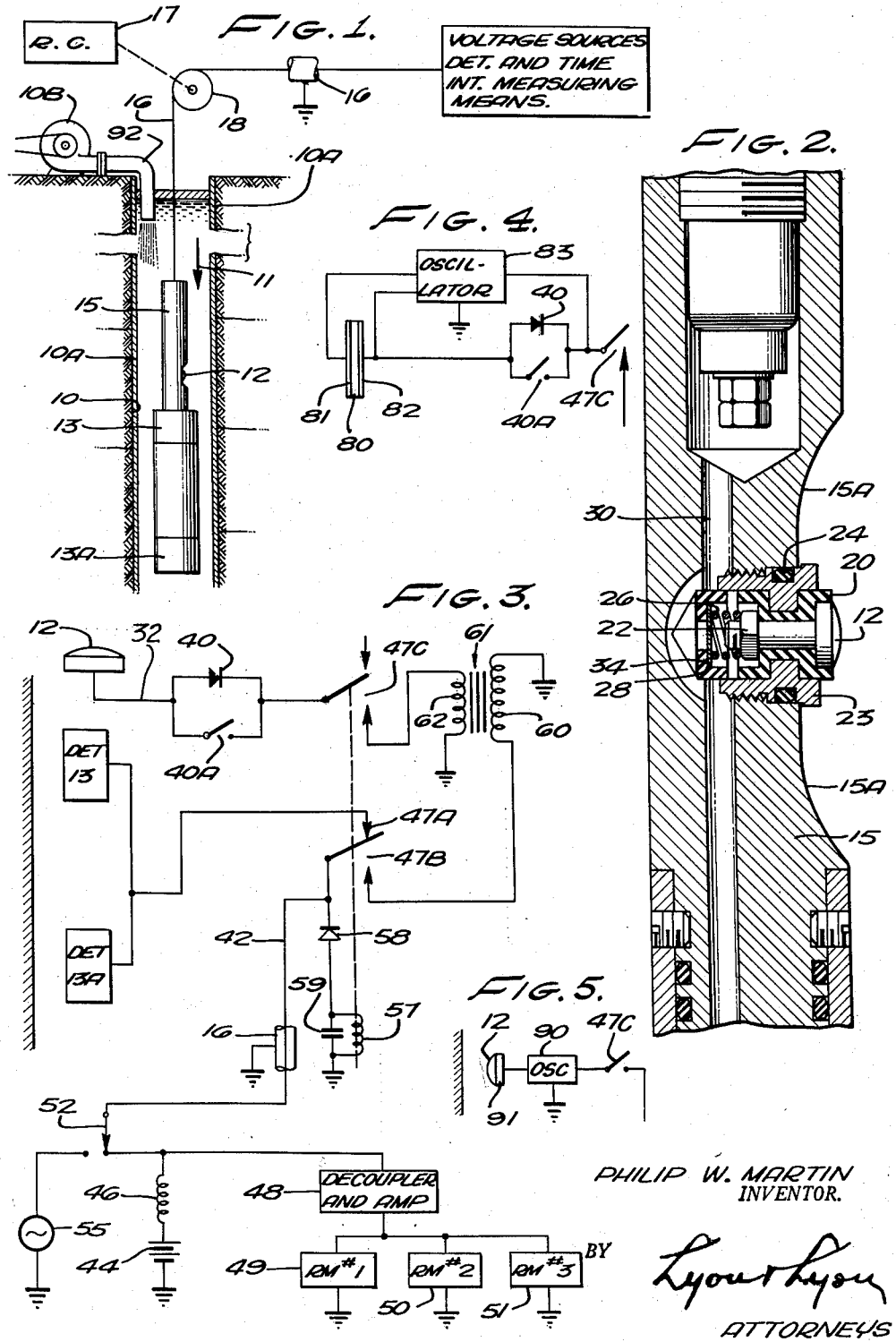
PHILIP W. MARTIN
INVENTOR.
BY Lyon & Lyon
ATTORNEYS

United States Patent Office 3,116,419
Patented Dec. 31, 1963

3,116,419
TRACER INJECTOR MEANS UTILIZING A
RADIOACTIVE ELECTRODE
Philip W. Martin, Whittier, Calif. (% McCullough Tool
Co., 5820 S. Alameda St., Los Angeles 58, Calif.)
Filed Aug. 6, 1959, Ser. No. 831,971
3 Claims. (Cl. 250—106)

The present invention relates to improved means and techniques useful in dispensing radioactive materials in controlled amounts and finds particular utility in the investigation of bore holes and porosity of surrounding formations, particularly in so-called secondary recovery methods used in the oil industry.

Today many oil fields are termed "depleted" but secondary recovery methods have been proposed and used to obtain oil from such depleted fields. Such secondary recovery methods involve generally the injection of water under pressure into one well or bore hole so as to cause the flow of oil and water out of adjacent wells in the same so-called depleted field. It has been estimated by various people in the oil business that billions of dollars' worth of unproduced oil still remains in the so-called depleted sands in depleted fields.

In this method of secondary recovery many problems arise, one of which involves the fact that the most porous sands regularly allow flow of the water and such porous sands are the sands that were probably most thoroughly depleted while at the same time the more tight sands which still have most of the oil remaining in them are rather impervious and thus a relatively small amount of water flows through such tight sands. Therefore, it is desirable to ascertain the porosity of the various formations surrounding a particular bore hole to be sure that the desired zones or formations are receiving water, particularly those zones that best stand a chance of producing oil.

For these purposes it has been proposed to use radioactive tracers to inject radioactive materials into the water stream and to trace the migration of the radioactive material in an attempt to ascertain the directions of fluid flow and their relative velocities, i.e. the porosity of various formation zones around a bore hole. The first attempt in this direction using radioactive tracers was to introduce the radioactive material into the flow line at the surface of the earth. Such attempts were not entirely successful largely because the zones that are accepting fluid in the well may be only a few feet thick and located at depths of, for example, 3,000 feet so that by the time the tiny radioactive slug, which may be only approximately one inch long at the surface, reaches the 3,000 foot depth, it may have dispersed over 200 feet in depth in the well, thereby rendering it virtually impossible to locate a three-foot bed in the well with a probe having a length of approximately 200 feet. From this it is very apparent that a successful attempt to locate a thin bed requires a sharp probe or a thin radioactive slug or tracer going into the formation.

It is more desirable to inject radioactive tracers to ascertain their migration using the logging technique which involves dispensing of the tracer starting from the bottom of the well with the dispensing tool moving upwardly against the flow of the fluid and with the radioactive material being periodically dispensed at different levels when and as the tool is being moved upwardly in the well. Tools have been developed for this purpose using radioactive tracers in the form of a liquid. Such liquid tracer dispensing equipment has heretofore been used and successful use requires the solution of many different problems arising from the fact that their operation is influenced by other conditions such as, for example, by pressure surges. Thus, for example, when a liquid tracer is dispensed by a pumping device, it is extremely difficult to keep the pumping device from ejecting fluid at different undesirable times because the fluid is being pumped into the well with a pump and the fluid passes various restrictions thus causing pressure surges with the result that the radioactive tracer may be ejected at undesired times. This problem will be appreciated more when one considers that the pressures encountered in this process in a deep well may vary as much as 10,000 pounds per square inch and thus one can more readily realize the extreme difficulties encountered with a mechanical fluid dispenser. Apart from this, there are other problems involving radioactive contamination as indicated more fully below.

Other techniques heretofore proposed involve shooting the radioactive materials into solution by the use of guns and explosives but one of the major disadvantages of this process is that one can only use a limited number of slugs in each operation and also there are difficulties involved in preparing each individual firing chamber.

All of these prior techniques also present a serious contamination problem and considerable time is required to decontaminate the dispensing tool after use. Further, personnel working with such prior art dispensing equipment are in greater jeopardy of losing their health than one who merely has to unscrew a plug on the end of a tong and place the same into a carrying case as is required in the present techniques incorporated in the present invention. The health problem involved in using loose or liquid radioactive tracers may be better appreciated when one considers that oftentimes these operations may be required to be carried out in rainy or windy weather.

In accordance with the present invention means and techniques are disclosed involving the use of solid radioactive materials which are dispensed using generally what may be termed an electrochemical process. The movement of the tracer so dispensed is observed with respect to a radioactive detector such as a scintillation counter to obtain information with respect to the porosity of various surrounding formations and, indeed, a so-called velocity profile may be obtained of the bore hole.

It is therefore an object of the present invention to provide improved means and techniques in which an isotope, used as a tracer, is dispensed in a novel manner from a solid substance, thereby requiring no liquid solution which might, upon spilling, be the source of contamination.

Another object of the present invention is to provide novel teachings whereby isotopes in the form of ions may be dispensed using generally an electrochemical process.

Another object of the present invention is to provide improved means and techniques whereby the amount of isotopes dispensed may be accurately determined and controlled, notwithstanding changing pressure conditions or pressure surges within the bore hole.

Another object of the present invention is to provide improved means and techniques useful in obtaining a velocity profile of liquid flow in a bore hole and the surrounding formations.

Another object of the present invention is to provide an improved tracer system in which the amount of isotopes dispensed is controlled accurately by either voltage or current flow.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates generally a system embodying features of the present invention.

FIGURE 2 illustrates constructional features of the isotope dispenser shown in FIGURE 1.

FIGURE 3 illustrates electrical circuitry for the isotope dispenser shown in FIGURES 1 and 2.

FIGURE 4 illustrates a modified form of the invention.

FIGURE 5 illustrates another modified form of the invention.

The isotope dispensing system is described in connection with a bore hole logging system although it will be appreciated that the same has many other uses.

Referring to FIGURE 1, the system is illustrated in a bore hole 10 which is usually cased by casing 10A and traverses formations of different porosities. The casing 10A is usually perforated opposite the formation zones into which it is desired to inject water for accomplishing well known secondary recovery of oil in so-called depleted formations, and means 10B, at the surface, usually in the form of a pump, is usually used to inject water under a constant pressure into the upper end of the casing 10A. The porosities of these formations may be determined either in terms of a velocity profile which indicates the time required for fluid to flow between two different regions in a bore hole or by determining the resulting change in radioactivity of such formations, using in either case a suitable radioactive detector 13.

Thus, it will be assumed for illustrative purposes that a flow of fluid created by pumping means 10B is in the downward direction indicated by arrow 11. At periodic intervals a radioactive isotope is dispensed into such fluid from the "button" or electrode 12. This isotope is carried by the fluid and when it passes the radioactivity detector 13, causes the same to respond to the radioactivity from such isotope. Thus, the time interval between liberation of the isotope at the electrode 12 and its arrival adjacent detector 13 is a measure of the velocity of the fluid flow between electrode 12 and detector 13. This velocity may be influenced by the porosity of the formations between these two points and hence the velocity is a measure of the same. The detector 13 may be mounted approximately two feet below button 12 and preferably a second detector 13A may be mounted eight feet below detector 13. Thus, the radioactive slug released by button 12 may first be detected by detector 13 and then later by detector 13A and the measured time interval between the electrical impulses developed in accordance therewith respectively in detectors 13 and 13A is a measure of the velocity of the fluid flow between detectors 13 and 13A.

The electrode 12 and detectors 13, 13A in, for example, the form of a Geiger-Mueller counter or scintillation counter, are both mounted on a tool or sonde 15 which is lowered by means of the cable 16 attached thereto to different selected levels. The particular location of the sonde 15 may be established using conventional means as, for example, a revolution counter (R.C.) 17 coupled to a pulley 18 over which the cable 16 is reeled.

This cable 16 may include one or more electrical conductors for controlling the electrode 12 for dispensing the isotope and for recording the time interval between pulses all above the surface. One manner in which this is accomplished is described later in connection with FIGURE 3.

As illustrated in FIGURE 2, the electrode 12 is insulated electrically by insulation 20 from the metal sonde 15 which has its outer periphery scalloped or recessed at 15A to provide a convenient recess for the button 12 such that the outer portion of button 12 extends an appreciable distance beyond adjacent metal portions but yet is confined with a cylinder defined by the unrecessed portion of the sonde. This construction provides some protection for the radioactive button or electrode 12.

As shown in FIGURE 2, the electrode 12 is in the form of a threaded bolt having its enlarged head exposed and having its threaded shank engaging the nut 22 to clamp the insulating material 20 within the central bore of the metal plug 23, this plug 23 being threaded into the recessed portion 15A with an O-ring seal 24 between the same.

A spring 26 bearing between the metal nut 22 and the metal washer 28 serves as an electrical contact element for providing an electrical connection which extends between an electrical wire (not shown) in the bore 30, the washer 28, spring 26, nut 22 and electrode 12. The washer 28 to which such wire is illustrated at 32 in FIGURE 3 is connected is insulated from the sonde by insulation 34.

This exposed portion of this electrode 12 is of radioactive material, portions of which may be dispensed in the form of ions by application of a suitable voltage to the same. The amount of such material dispensed is determined by the time during which such voltage is applied in accordance with principles applicable also to electrochemical deposition of metals in electrolytic cells. Indeed, the electrode 12 may be considered to be an element or electrode of an electrolytic cell. The other electrode is the metal sonde 15 which, of course, is insulated from the electrode 12; and the electrolyte may be considered to be the fluid or material between the electrode 12 and adjacent metal portions of the sonde 15.

As is explained in more detail later, the voltage applied to the electrode 12 is preferably an A.C. (alternating current) voltage, although in some instances a D.C. (direct current) voltage may be used. In accordance with an important teaching of the present invention, there may be an electrodeposition of metal or material with A.C. for the present purposes, even though the result may not be accomplished using D.C.

The electrode 12 may, for example, comprise a metal in which there is included the parent cobalt metal, i.e. cobalt 58 with other non-radioactive metals, together with the radioactive cobalt isotope, cobalt 60.

Other radioactive metals or materials may be used and when a radioactive metal is used, it is preferred that the electrode include also the same metal in its non-radioactive or parent form, i.e. as in the above example, cobalt 60 and cobalt 58.

FIGURE 3 illustrates different forms of energizing circuits in which the electrode 12 is energized with A.C. when the rectifier 40 is absent, i.e. short-circuited by switch 40A; and such electrode 12 is energized with D.C. when the rectifier 40 is active, i.e. when switch 40A is open. The ungrounded center conductor 42 of the logging line 16 is connectable to the D.C. source 44 through the single pole double throw switch 52 and decoupling means illustrated as a choke coil 46; and such center conductor 42 normally supplies energizing currents to the counter or detector circuits 13 and 13A through the normally closed relay switch 47A. These detectors 13 and 13A are thus normally effective to produce electrical pulses in response to radiation in the bore hole or formations immediately adjacent the same; and such electrical pulses are normally conveyed back to the surface equipment including the decoupling network and amplifier stage 48 and recording means 50, 51 designated as RM #2 and RM #3 respectively in FIGURE 3 through the aforementioned relay switch 47A and line 42. When it is desired to inject a radioactive tracer, the switch 52 is actuated to its other position to thereby connect the ungrounded terminal of A.C. source 55 to the conductor 42 to thereby energize the relay coil 57 through rectifier 58, the winding 57 being shunted by condenser 59 and the rectifier 58 being so poled that it prevents D.C. from source 44 flowing through winding 57. When winding 57 is thus energized with rectified A.C., the relay switch 47A is opened, relay switch 47B is closed, and relay switch 47C is closed to thereby energize the primary winding 60 of transformer 61 and associated secondary winding 62 having one of its terminals grounded and the other one of its terminals connected through switch 47C to the button 12 through either rectifier 40 or switch 40A as the case may be. When it is desired to apply A.C.

to the button 12, switch 40A is closed prior to placing the sonde in the well bore and conversely such switch 40A is allowed to remain open when it is desired to apply a unidirectional voltage to the button 12.

If desired, the time at which switch 52 connects the A.C. source 55 to line 42 may be recorded using the recording means 49 designated as RM #1. This switch 52 connects source 55 only for a relatively short period of time. After release of the isotope tracer from button 12, it in turn passes the detectors 13 and 13A (at which time switch 52 is open and the relay switches are in their positions illustrated in FIGURE 3) to produce electrical pulses in detectors 13 and 13A; and such pulses with some time delay between the same, representative of velocity of fluid flow, are recorded by recording means 50 and 51 respectively.

The radioactive tracer liberated from the button 12 is considered to be in the nature of an ionic current following analogy to an electrochemical system wherein the grounded well casing is one electrode and the fluid in the well is the "electrolyte." The ionic current thus released under some conditions follows variations in the alternating supply; however, under certain conditions it is desirable to use direct current of suitable polarity in which case the switch 40A remains open. The amount of tracer liberated from a solid condition is dependent upon the length of time during which the relay switch 47C is closed and upon the amount of current, i.e. the product of time and current, which product is expressed in terms of coulombs.

The resulting pulses developed in the detector or counter 13 and applied to line 42 are insufficient in both amplitude and duration to charge condenser 49, i.e. the relay is not operated by these pulses.

The radioactive materials which may be used are numerous. As additional examples, iodine 131 may be chemicaly plated onto a silver disc; and in such case it becomes necessary to maintain a positive bias on a silver electrode activated with iodine to prevent the "plating" off of the iodine in an arrangement in which water is the electrolyte and iron is the other electrode.

Another isotope which may be used is silver 110. In the use of silver 110, the energy of the gamma rays are very high, making a good tracer from that standpoint. The present system, involving a simple method of dispensing, allows the use of longer half-life material, and this is of particular importance when the material is required to be shipped long distances from its place of manufacture to isolated oil fields as, for example, to the Peace River district in Canada or to some relatively inaccessible place in the United States during which a sizable part of its half-life may otherwise be expanded in transit.

Thus, cobalt 60, having a half-life of 5.27 years, is preferably used for the additional reasons that it is a safer isotope to use because it does not concentrate in any one part of the body and the permissible body burden is approximately one thousand times higher than it is for radioactive iodine. Furthermore, radioactive cobalt produces extremely hard gamma rays and for that reason, a much smaller amount of the tracer is necessary. Also, when using a scintillation type of counter, as is preferred herein, the bias may be set sufficiently high so that the counter detects the hard gamma rays to the exclusion of most of the natural earth gamma radiation. Another advantage of using cobalt 60 is that it is dispersed equally between oil and water without being selectively absorbed by either oil or water. When, for example, the element iridium is used, it is absorbed almost wholly by oil and thus may be used for detection of oil in the well; and if it is injected into the well, it is apt to be picked up by the oil-bearing formations where there are grains covered with oil and thus the radioactivity would remain in one fixed place in the well rather than going into the formations.

It will thus be seen that a simplified radioactive tracer dispensing system has been developed in which a radio-isotope is carried in solid form in metallic or chemical bond. The metal cobalt or the metal iridium, in their radioactive form, may be plated onto an electrode. On running the tool in a well or bore hole, it will electrolytically dispense the radioactive material into the well fluid when a potential is applied. This radioactive material may also be dispensed from such an electrode ultrasonically and/or electrically as explained in more detail below.

In a practical tool, the electrode 12 may have a charge in the order of 600 microcuries and periodically a voltage is applied to produce therefor or dispense therefrom a slug of 1 microcurie.

It will be appreciated that the radioactive isotope may be either electrochemically or chemically plated on the electrode 12 or that a combination of these two processes may be used.

The radioactive isotope may also be released electrochemically. In such case the electrode 12 may comprise a flat piezoelectric ceramic disc 80 as shown in FIGURE 4 having its surfaces metalized at its terminals 81 and 82. An auxiliary high frequency source or oscillator 83 in, for example, the ultrasonic range, is connected to terminals 81 and 82 and applies a voltage to the crystal at the same frequency as the inherent resonant frequency of such crystal. The source 83 is energized when switch 47C is closed, in which case the crystal electrode 80 is vibrated and radioactive ions are released not only electrically but also by the ultrasonic vibrations whereby the ions are projected both mechanically and electrically in the fluid.

As previously indicated, the porosity of the ambient formations may be also determined by measuring the retained radioactivity of the various formations. In those cases where the formation is radioactive in proportion to the amount of the radioactive fluid in back of the casing, the zone in which there is the greatest amount of tracer will be the "hottest" when one surveys the well bore. Then one will wait a short period of time and survey the well again and those zones that are taking fluid most rapidly will most rapidly flush and thus one will no longer find the radioactive materials in the flushed zone. Thus, one ascertains which of the zones are taking the fluid most rapidly and takes the desired steps to flush the zones one wishes to flush.

The modification shown in FIGURE 5 operates without the superposition of either A.C. or D.C. as in FIGURE 4 (other than the oscillation currents produced by oscillator). In FIGURE 5 when the relay switch 47C is closed using the circuitry otherwise shown in FIGURE 3, the oscillator 90 is fully energized to produce an oscillating voltage in oscillator 90, such as voltage appearing between ground and the piezoelectric button 91 to produce mechanical and electrical oscillations for dispensing the tracer from button 12.

The tracer may be dispensed at other locations. For example, the button 12 in FIGURES 1, 2, 3, 5 and the crystal 80 in FIGURE 4 may be located at or near the surface in the fluid feed line 92 so that the tracer dispensed in any one of the manners described above is injected into the fluid when and as it enters the well bore. Also, it is clear that such tracer dispensing may be accomplished using these means and techniques other than in the oil field industry. One of the successful uses to which these means and techniques have been applied is in a determination of lost circulation positions in a well while being drilled.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. Apparatus for dispensing a controlled amount of radioactive tracer material within a predetermined position of a bore hole extending into the earth said apparatus comprising a tool adapted to be lowered into said bore hole, a cell on said tool including a first electrode, said first electrode consisting of a mixture of a non-radioactive material and a radioactive material, both materials being in the solid state, said tool forming the second electrode of said cell, a voltage source, and control means disposed on the surface of the earth and above said bore hole for connecting said first electrode to said voltage source at a predetermined time and for a predetermined time interval to produce a controlled current flow between the electrodes in said bore hole.

2. Apparatus as set forth in claim 1 in which said first electrode is simultaneously subjected to mechanical vibrations.

3. Apparatus as set forth in claim 1 wherein said first electrode consists of a mixture of non-radioactive cobalt 58 and radioactive cobalt 60.

References Cited in the file of this patent

UNITED STATES PATENTS

| | | |
|---|---|---|
| 2,583,288 | Arps | Jan. 22, 1952 |
| 2,617,941 | Craggs | Nov. 11, 1952 |
| 2,659,046 | Arps | Nov. 10, 1953 |
| 2,904,112 | Wiley | Sept. 15, 1959 |